Patented Mar. 2, 1943

2,312,788

UNITED STATES PATENT OFFICE 2,312,788

GLASS ENAMELS

Ray Andrews and Robert J. King, Washington, Pa., assignors to B. F. Drakenfeld & Co., Inc., New York, N. Y., a corporation of New York No Drawing. Application December 9, 1938, Serial No. 244,865

1 Claim. (Cl. 106—49)

By the invention hereinafter claimed, we are able to obtain enamel fluxes of high resistance to acids, alkalies and sulphides with a melting point of around 1120° Fahrenheit, with the result that greatly improved acid, alkali and sulphide resisting properties have been produced. Enamel fluxes (herein termed high melting glass enamel fluxes) having a melting point near 1120° Fahrenheit that have still greater acid and alkali and sulphide resisting properties may be also produced by this invention. While these enamel fluxes in general are very resistant to acids, alkalies and sulphides by varying the composition we can increase the alkali resistance or increase the acid resistance or increase the sulphide resistance. The coefficient of expansion in these enamels is such as to permit its use on glass of usual composition.

The following is a batch for a chemically resistant enamel flux according to this invention, melting near 1120° F.

|  | (A) | |
|---|---|---|
|  | Parts | Percentage |
| PbO | 564 | 45.1 |
| $SiO_2$ | 226 | 18.1 |
| Borax | 100 | 8. |
| CdO | 35 | 2.8 |
| $Na_2TiSiO_5$ | 100 | 8. |
| $Li_2CO_3$ | 40 | 3.2 |
| Zircon sand | 110 | 8.8 |
| 66% $ZrO_2$ |  |  |
| 33% $SiO_2$ |  |  |
| Boric acid | 75 | 6. |
|  | 1,270 |  |

The enamel flux resulting from melting the above batch presuming no volatilization of glass ingredients takes place are as follows:

|  | A |
|---|---|
| PbO | 48.8 |
| $SiO_2$ | 25.4 |
| $B_2O_3$ | 7.55 |
| CdO | 3.03 |
| $Na_2O$ | 4.1 |
| $TiO_2$ | 3.42 |
| $Li_2O$ | 1.4 |
| $ZrO_2$ | 6.35 |

The softening point of these enamel fluxes is controlled by increasing the lithia and lead to lower the melting point and increasing zirconium, titanium and silica to raise the softening point. Increasing zirconium oxide, titanium oxide and silica will increase the stability against chemical attack.

The cadmium oxide in the above batch is present merely as a stabilizer when pigments containing cadmium sulphide, cadmium sulphide compounds (lithophones) and selenium compounds are used with the fluxes.

Having thus described our invention what we claim is:

A homogeneous enamel flux for glass melting around 1100° F. having higher resistance to acids, alkalies and sulphides, analytically containing substantial percentages of lead oxide, silica and boric acid and also containing sodium oxide about 4%, lithium oxide about 1½%, titanium oxide about 3%, and zirconium oxide about 6%.

RAY ANDREWS.
ROBERT J. KING.